United States Patent [19]
Behling

[11] 3,793,077
[45] Feb. 19, 1974

[54] BATTERY INCLUDING APPARATUS FOR MAKING HALOGEN HYDRATE

[75] Inventor: Harvey L. Behling, Clawson, Mich.

[73] Assignee: Occidental Energy Development Company, Madison Heights, Mich.

[22] Filed: July 5, 1972

[21] Appl. No.: 257,114

[52] U.S. Cl.............. 136/6 E, 136/86 C, 136/154, 136/161, 23/273 F, 423/462
[51] Int. Cl. ........................................ H01m 35/00
[58] Field of Search...136/6, 83, 155, 161, 162, 154, 136/86 C

[56] References Cited
UNITED STATES PATENTS

| | | | |
|---|---|---|---|
| 3,713,888 | 1/1973 | Symons | 136/6 |
| 3,328,202 | 6/1967 | Riffe | 136/155 |
| 3,408,232 | 10/1968 | Blue et al | 136/155 |
| 3,256,070 | 6/1966 | Trickey | 23/294 |
| 3,694,170 | 9/1972 | Fujii et al | 23/294 |

Primary Examiner—A. B. Curtis
Assistant Examiner—C. F. Lefevour
Attorney, Agent, or Firm—William J. Schramm

[57] ABSTRACT

Electrical energy system including apparatus for making halogen hydrate whereby water in an aqueous solution and an elemental halogen are combined in the form of a thin liquid film on a continuously moving surface which is maintained within a controlled temperature range to promote the formation of the corresponding halogen hydrate as a solid layer on the surface. The layer of solidified halogen hydrate is continuously removed from the surface by scraping and the resultant flakes or particles are transferred by a conveyor to storage.

6 Claims, 5 Drawing Figures

BATTERY INCLUDING APPARATUS FOR MAKING HALOGEN HYDRATE

BACKGROUND OF THE INVENTION

The present invention broadly relates to electrical energy storage systems utilizing a halogen hydrate as the source of a halogen component for reduction at a normally positive electrode and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halide and is circulated between the electrode area and a storage area containing halogen hydrate which progressively decomposes during a normal discharge of the electrical energy storage system, liberating additional elemental halogen to be consumed at the positive electrode.

Electrical energy storage systems or secondary batteries of this type are categorized as being of the so-called high energy density (H.E.D.) type since they are capable of supplying upwards of 50 watt hours of electric power per pound of weight. The high energy capacity and compactness of such H.E.D. batteries renders them particularly satisfactory for use as principal or auxiliary sources of electrical energy in both mobile and stationary power plant systems. A metal/halogen hydrate secondary storage battery of the foregoing type is described in detail in copending U.S. Pat. application Ser. No. 50,054, filed June 26, 1970 now U.S. Pat. No. 3,713,888, entitled "Halogen Hydrates," which is owned by the same assignee as the present invention. The specific teachings of the aforementioned United States patent application are incorporated herein by reference.

Among the advantages of secondary storage batteries of the metal/halogen hydrate type is the ability of such systems to be refueled or recharged quickly and efficiently whereby they are again restored to full-charged capacity. In a refueable secondary storage battery, the halogen constituent is replenished by withdrawing a proportion of the aqueous electrolyte and substituting therefor a halogen hydrate which, upon decomposition during normal discharge, liberates elemental halogen and water, whereby the concentration of the metal halide in the electrolyte remains substantially constant during the discharge cycle. The halogen hydrate comprises a compact and extremely convenient method of storing and replenishing the halogen component in the storage system. In a rechargeable storage battery system, a reverse electrical current is applied to the electrode area, whereby the halide is reduced to the elemental halogen which is recovered as a gas and is reconverted in the presence of water to the corresponding halogen hydrate which is separated and returned to the halogen hydrate storage area within the system. In either event, the formation of the halogen hydrate is accomplished under controlled temperature conditions, whereby halogen and water are combined to produce a corresponding solid hydrate. This operation can be performed within the system itself or by a central hydrate processing unit disposed remote from the electrical energy storage system.

The present invention is directed to an improved apparatus and process for producing halogen hydrate in an efficient and economical manner utilizing the aqueous electrolyte as a source of the water and halogen components or, alternatively, sources of these two components independent of the electrical energy storage system.

SUMMARY OF THE INVENTION

The benefits and advantages of the present invention are achieved by a secondary electrical energy storage system incorporating or associated with a halogen hydrate forming apparatus which produces solid halogen hydrate in a form suitable for replenishing the hydrate reservoirs of such storage systems. In its apparatus aspects, the present invention is directed to a halogen hydrate apparatus which comprises a framework which defines a three-dimensional enclosure within which a supply of aqueous solution is provided that contains a halogen therein. A member, including a surface, is mounted within the enclosure for movement relative to the supply of aqueous solution in a manner so as to continuously apply a film of solution on the surface. The solution, as well as the surface and film thereon, are maintained at controlled temperatures conductive to the formation of the halogen hydrate by a conversion of the liquid film into a solid layer on the surface. The enclosure further contains an atmosphere comprised predominantly of the halogen constituent which is disposed in contact with the liquid film on the surface. Suitable removal means, such as a scraper, are positioned relative to the member so as to effect a dislodgement of the solidified layer of halogen hydrate in the form of flakes or particles which are transferred to a conveyor for transport to a location remote from the enclosure.

In its method aspects, the present invention relates to an improved system for storing electrical energy and to an improved method of forming halogen hydrate during a recharging or refueling of the system.

Still further benefits and advantages of the present invention will become apparent upon a reading of the description of the preferred embodiments, taken in conjunction with the accompanying drawings.

DESCRIPTION OF THE PREFERRED EMBODIMENTS

Figure 1:
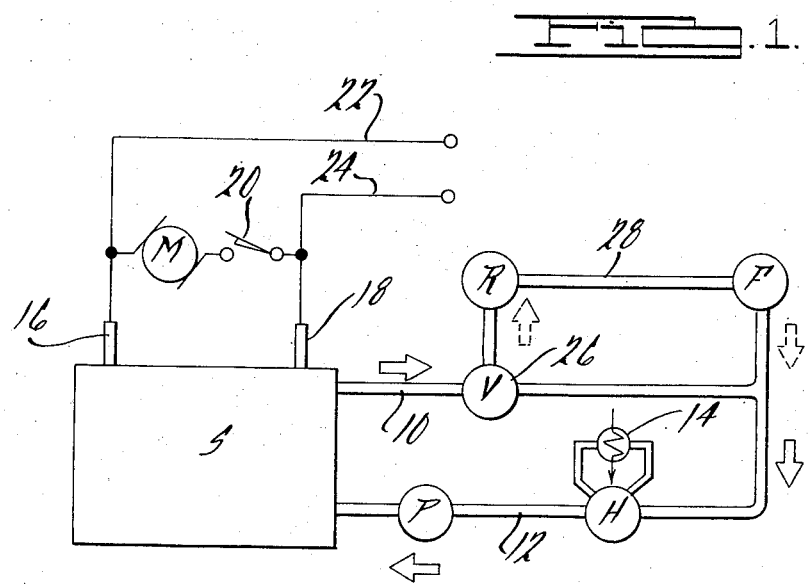
FIG. 1 is a schematic flow sheet illustrating the important components of an electrical energy storage system of the type to which the hydrate forming apparatus of the present invention is applicable.

The oxidizable metal/halogen hydrate electrical energy storage system to which the present invention is applicable comprises an electrolyte consisting of a solution containing a dissolved metal halide and a dissolved and/or entrailed halogen gas which is adapted to be reduced upon coming in contact with the normally positive electrode of a cell during the normal discharge cycle of the device. The electrolyte may further contain various additives and ingredients to impart controlled modifications and/or variations in the physical and chemical properties thereof in order to provide optimum efficiency in operation of the electrical energy storage device under different operating circumstances.

In accordance with a preferred practice of the present invention, the electrolyte is comprised of an aqueous solution which may contain from as little as about 0.1 percent by weight up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, Na, Rb, Cs, Be, Mg, Ca, Sr and Ba. Those metals which react with water may be allowed to induce stability, such as amalgams (solutions in mercury). Of the foregoing metals, zinc constitutes the most preferred metal, while iron, cobalt and nickel are preferable to the remaining enumerated metals. Of the various halogen constituents, chloride and bromine are preferred and the chloride salts of the aforementioned preferred metals are particularly satisfactory in the practice of the present invention and constitute a preferred embodiment thereof. Particularly satisfactory results are obtained employing an aqueous electrolyte incorporating zinc chloride as the metal halide.

Although as previously indicated concentrations of the metal halide in the electrolyte as low as about 0.1 percent can be employed, it is preferred that the metal halide be present in concentrations of at least about 5 percent to about 50 percent, and more usually in concentrations from about 10 up to about 35 percent by weight. In those instances in which zinc chloride is utilized as the metal halide, a maximum conductivity of the electrolyte is obtained when a concentration of about 25 percent by weight of zinc chloride is present. Accordingly, when zinc chloride is the metal halide in an aqueous electrolyte, concentrations ranging from about 10 to about 35 percent by weight have been found particularly satisfactory.

The electromechanical reaction that occurs in the storage battery is represented by the following equations, which are representative of the situation in which the oxidizable metal is zinc, the halogen is chlorine and the hydrate is chlorine hydrate.

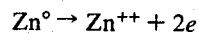
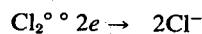
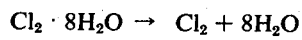

$$Zn^\circ \rightarrow Zn^{++} + 2e$$
$$Cl_2^\circ \circ 2e \rightarrow 2Cl^-$$
$$Cl_2 \cdot 8H_2O \rightarrow Cl_2 + 8H_2O$$

As will be noted from the foregoing equations, the progressive oxidation of the zinc to a zinc ion which becomes dissolved in the electrolyte and a corresponding reduction of elemental chlorine to a chloride ion, which also becomes dissolved in the electrolyte, would tend to effect an increase in the concentration of the metal halide in the electrolyte were it not for the fact that the progressive decomposition of the halogen hydrate results in a progressive liberation of water serving as a diluent, thereby maintaining the metal halide salt concentration in the electrolyte reasonably constant throughout the discharge cycle of the storage battery. Although the concentration of the electrolyte remains substantially constant, the total volume thereof progressively increases and appropriate provision is made in the system for accommodating such an increased electrolyte volume during operation of the storage device. As halogen hydrate decomposes, more space is available in the storage area for handling the electrolyte. A corresponding reduction in the volume of electrolyte occurs during a recharging of the electrical storage system in which a corresponding amount of dissolved metal halide is removed from the electrolyte and a resultant halogen, in combination with a portion of the water, is formed into the corresponding halogen hydrate for storage.

Referring now in detail to the drawings, and as may be best seen in FIG. 1, a typical flow arrangement of a rechargeable electrical energy storage system is illustrated in accordance with the preferred practice of the present invention. As shown, the system comprises an electrode area of stack, indicated at S, which is comprised of one and more usually a plurality of individual cells, each containing a normally positive electrode and a normally negative electrode. The stack is connected by means of an outlet pipe 10 and a return pipe 12 to a halogen hydrate storage area or receptacle, indicated at H, and through which pipes of the electrolyte is continuously recirculated such as by means of a pump P. The passage of the electrolyte through the hydrate storage reservoir H during a normal discharge cycle of the storage device effects a progressive decomposition of the halogen hydrate therein, whereby the liberated halogen gas is dissolved and/or entrained in the electrolyte and is conveyed by means of the return line 12 to the stack S for replenishment of the supply of elemental halogen at the normally positive electrodes therein. Since the decomposition of the halogen hydrate is an endothermic reaction, the storage reservoir H suitably may be provided with a heat exchanger, indicated at 14, for maintaining the halogen hydrate and the electrolyte therein at a temperature at which optimum performance of the storage battery is achieved during a discharge cycle.

The stack S, as shown in FIG. 1, is provided with a positive terminal 16 and a negative terminal 18, which are adapted to be electrically connected to a load, such as a drive motor M, which is selectively operable in response to a switch 20 disposed in series in the circuit. At such time that the reactive constituents within the electrical energy storage device becomes depleted or approach depletion, an electrical recharging of the storage system is effected by applying an electrical current of opposite polarity across the terminals 16, 18, such as by wires 22, 24, respectively, which are adapted to be electrically connected to an external power source, such as a commercially generated alternating current which has been subjected to rectification for use in the recharging cycle.

During the recharging cycle, a reversal of the chemical reaction is effected whereby the oxidized metal present in the form of a dissolved ion in the electrolyte is reduced at the normally negative electrode and deposits or plates out while the halide ion becomes oxidized at the normally positive electrode, returning to the elemental state in the form of dissolved or minute gas bubbles in the electrolyte. The halogen gas thus formed is continuously removed from the cell by the electrolyte through the outlet line 10 and the electrolyte is diverted, such as by a selector valve 26, through a branch circuit 28 having a cooling or refrigeration device R therein and a hydrate former device F for effecting a regeneration of the halogen hydrate. The halogen hydrate thus regenerated is returned by the circulating electrolyte to the storage reservoir H in which it is separated and retained in readiness for the next discharge cycle of the storage device.

In accordance with one embodiment of this invention, the hydrate former F and the cooling or refrigeration apparatus R are incorporated in the system in accordance with the arrangement schematically illustrated in FIG. 1. In this embodiment, a recharging of the electrical energy storage system can conveniently be achieved by connecting the wires 22, 24 to a commercial source of a rectified current, such as purchased from a local utility, effecting an in situ recharging of the system from time to time as may be necessary. Systems of this arrangement are suitable for use as the principal or auxiliary power system for the propulsion of vehicles or other mobile apparatus.

In accordance with an alternative satisfactory embodiment of this invention, the hydrate former F and the refrigeration or cooling unit R are disconnected from the system during normal discharge thereof and are located at a central processing or service station. In accordance with this latter arrangement, an appropriate amount of electrolyte is withdrawn from electrical storage systems which are in a substantially discharged condition and the electrolyte is reprocessed through the local service station processing facility to effect a regeneration of the halogen hydrate and a recovery of the metal. The halogen hydrate and metal can be directly inserted into the discharged storage battery, effecting a refueling thereof and a restoration of the battery to a fully charged condition. The refrigeration unit R and the hydrate former provide for increased efficiency due to the larger size of such units, which are adaptable for servicing a plurality of storage batteries, while at the same time providing for a proportional reduction in the weight of such storage battery systems in view of the elimination of the refrigeration and hydrate forming components.

Figure 2:
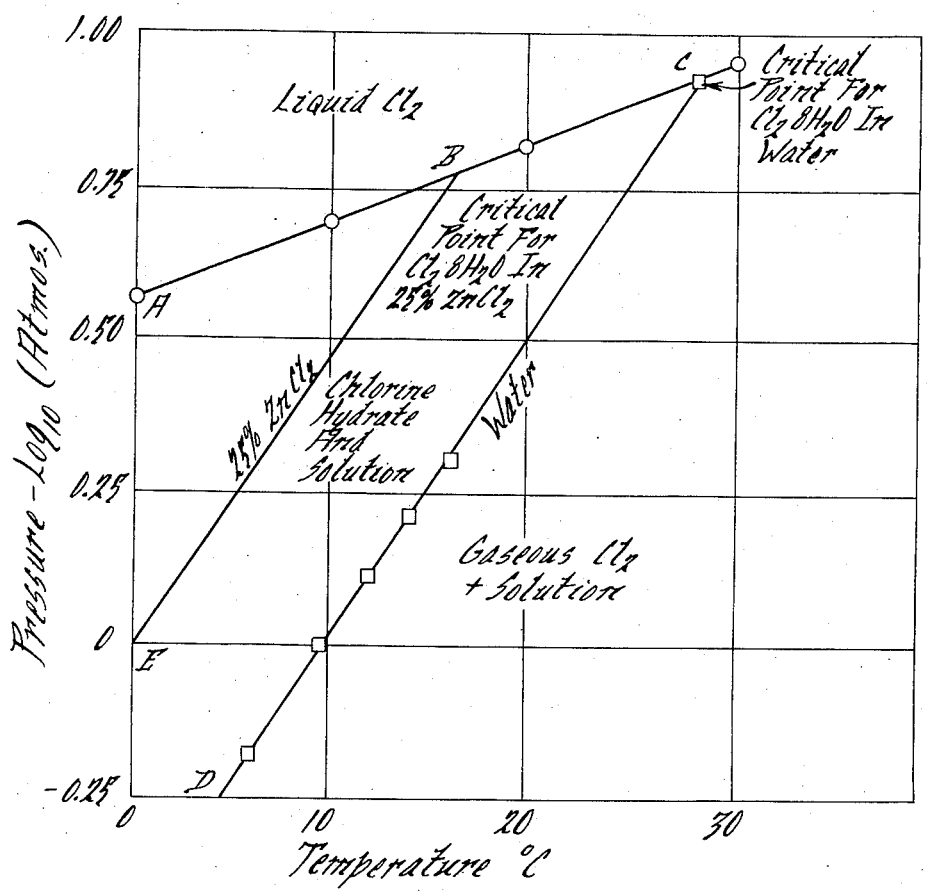
FIG. 2 is a phase diagram for a halogen hydrate system in which the halogen comprises chlorine, the metal comprises zinc and the aqueous solution contains zinc chloride.
Figure 3:
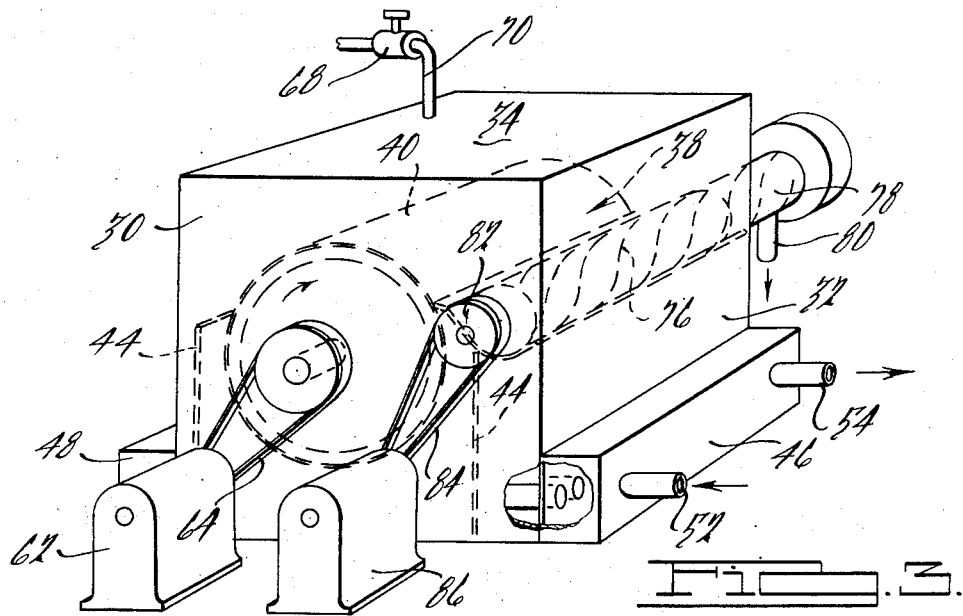
FIG. 3 is a perspective view, partly in section, of a hydrate forming apparatus constructed in accordance with the preferred embodiments of this invention.
Figure 4:
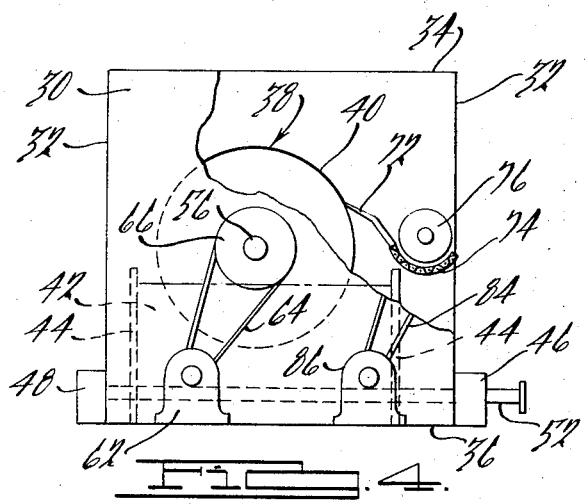
FIG. 4 is an end elevation view with portions broken away of the apparatus shown in FIG. 3.
Figure 5:
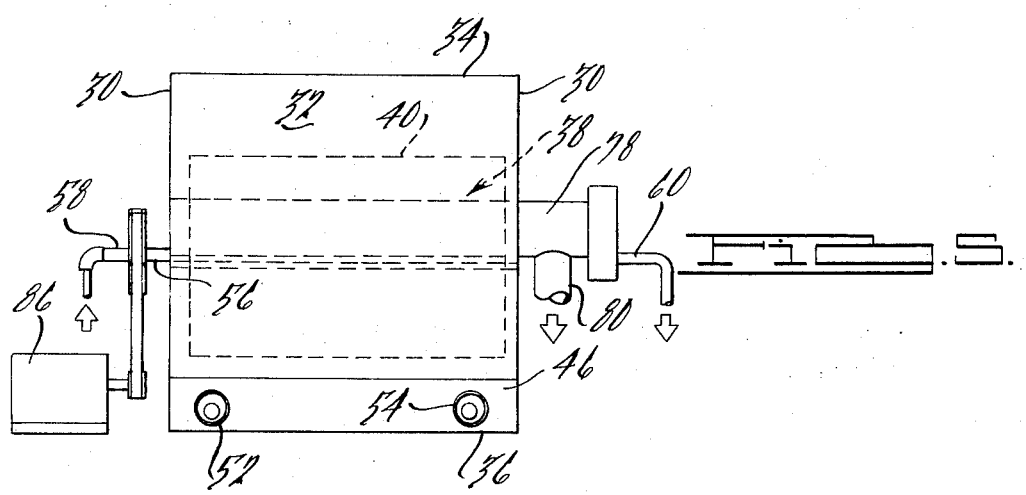
FIG. 5 is a side elevational view of the apparatus shown in FIG. 4.

In either event, a hydrate former constructed in accordance with the preferred practice of the present invention is illustrated in FIGS. 3–5 of the drawings. The particular temperature, pressure and operating characteristics of the hydrate former shown will vary depending upon the composition of the electrolyte or aqueous solution employed, the type of halogen utilized and with the concentration and type of metal ions present. A phase diagram is shown in FIG. 2 which depicts a temperature-pressure relationship of the various phases present in the critical temperatures and pressures applicable to chlorine hydrate which comprises the preferred hydrate of the present invention. As noted in FIG. 2, the area bounded by the points A, C, D, encompasses those conditions in which chlorine hydrate is present as a solid in water. Below and to the right of the line C D gaseous chlorine is present in water. Above and to the left of line A C, liquid chlorine is present. In the area bounded by points A, B and E, chlorine hydrate is present as a solid in a 25 percent concentration of zinc chloride in water. It will be appreciated that the phase diagram, as shown, encompasses three phases, namely: solid, liquid and gas. The critical temperature of a halogen hydrate, such as chlorine hydrate as shown in FIG. 2, is defined for the purposes of the present invention as that temperature above which a halogen hydrate cannot exist.

Referring now in detail to FIGS. 3–5, the hydrate former shown comprises a framework defining a three-dimensional enclosure comprised of a pair of opposed end panels 30, a pair of opposed side panels 32, a top panel 34 and a base panel 36. Due to the presence of gaseous halogen, the enclosure preferably is of a gastight construction and is comprised of a material compatible with and resistant to attack by the halogen and electrolyte or aqueous solution. Disposed within the enclosure and extending between the end panels 30, is a drum 38 of a substantially circular cross sectional configuration and having a peripheral surface 40 which is preferably comprised of a metal or other heat conductive material. The lower peripheral portion of the drum 38 is positioned such that the peripheral surface thereof is adapted to be immersed within a body of an aqueous solution, indicated at 42, contained within a tank defined by a pair of partitions 44 mounted within the enclosure.

Temperature control of the body of aqueous solution is achieved by a heat transfer arrangement comprised of manifolds 46, 48, which are secured to the lower portion of the side panels 32 and are disposed with the interiors thereof in communication with the ends of a plurality of heat transfer tubes 50 extending transversely of the enclosure and through the lower portion of the body of aqueous solution. A suitable heat exchange fluid which enters through an inlet pipe 52 connected to one end of the manifold 46 is circulated through the tubes in a serpentine manner, whereafter it is discharged through an outlet 54 at the opposite end of the manifold 46.

In addition to controlling the temperature of the aqueous solution, a cooling of the peripheral surface 40 of the drum is also effected in order to extract the heat liberated during the endothermic formation reaction of the halogen hydrate on the surface thereof. A cooling of the drum surface, as well as the liquid film thereon, to within a temperature range conducive to the formation of the halogen hydrate under the pressure conditions present in the enclosure is achieved by mounting the drum on tubular trunnions 56 through which a suitable cooling fluid can be circulated. As best seen in FIG. 5, a cooling liquid is adapted to enter the interior of the drum 38 through an inlet conduit 58 and to exit through the opposite trunnion through an outlet conduit 60.

Rotation of the drum at a preselected peripheral speed is achieved by a geared drive motor 62 which is drivingly coupled by means of a belt 64 to a pulley 66 affixed to the end of the trunnion shaft 56 extending from one end of the drum. The rotation of the drum is controlled so as to apply a continuous film of the aqueous solution to the peripheral surface of the drum in response to its relative movement therethrough, whereafter the liquid film solidifies to form the corresponding halogen hydrate present as a continuous layer on the surface of the drum. A replenishment of the aqueous solution and a control of the halogen atmosphere preferably greater than 75 percent by volume Halogen within the enclosure can suitably be achieved through a flow control valve 68 connected to a supply line 70 at the top of the enclosure as is best seen in FIG. 3.

A removal of the solidified layer of halogen hydrate from the surface of the drum in the form of particles or flakes is continuously achieved by means of a scraper blade 72 extending longitudinally of the peripheral surface and in dislodging contact therewith. The outer end of the scraper blade terminates, as best seen in FIG. 4, in an arcuate foraminous trough or screen 74 extending longitudinally of the interior of the enclosure. The arcuate trough 74 enables drainage of any residual liquid in the flaked halogen hydrate removed from the peripheral surface of the drum and for its return to the body of liquid within the enclosure.

It will be apparent from the foregoing arrangement that the thickness of the layer of halogen hydrate formed on the peripheral surface of the drum will be dependent upon the speed of rotation of the drum, the length of peripheral drum surface immersed in the body of liquid, and rate of heat removal from liquid film deposited thereon. The foregoing variables preferably are controlled so as to deposit a layer of halogen hydrate of at least about 0.05 up to about 0.75 millimeters in thickness. A control of the specific thickness is most conveniently achieved by controlling the speed of drum rotation which can range from about 0.25 up to about 25 RPM.

A transfer of the drained halogen hydrate flakes from the foraminous trough is achieved, such as by a screw conveyor 76 formed with a tubular extension or housing 78 projecting exteriorly of the enclosure and formed with a discharge chute 80, through which the flaked halogen hydrate is discharged. The screw conveyor is formed with a pulley 82, as shown in FIGS. 3 and 5, which is drivingly coupled by means of a belt 84 to a geared drive motor 86 for effecting a continuous rotation thereof.

In accordance with the foregoing arrangement, particulated or flaked solid halogen hydrate can be produced in a continuous economical manner and delivered to a point exterior of the enclosure in which it can alternatively be conveyed, such as by an electrolyte, to the hydrate storage reservoir of the electrical energy storage system or, alternatively, can be directly charged into such reservoir cannisters for replacement in electrical energy storage systems requiring refueling.

While it will be apparent that the invention herein disclosed is well calculated to achieve the benefits and advantages as hereinbefore set forth, it will be appreciated that the invention is susceptible to modification, variation and change without departing from the spirit thereof.

What is claimed is:

1. In a secondary electrical energy storage system, the combination comprising at least one cell comprised of a normally positive electrode for reducing a halogen disposed in electrical contact therewith and a normally negative electrode for oxidizing an oxidizable metal disposed in electrical contact therewith during an electrical discharge of said cell, a storage reservoir adapted to contain a quantity of halogen hydrate, an aqueous electrolyte containing ions of said metal and said halogen, communicative means for connecting said cell to said reservoir, circulating means for circulating said electrolyte through said communicative means between said cell and said reservoir for progressively oxidizing said oxidizable metal and decomposing said halogen hydrate during discharge of said cell, recharging means associated with said storage system including a source of electrical energy to effect an oxidation of the ions of said halogen to the elemental state, means for recovering the elemental halogen produced, and hydrate forming means for forming a mixture of the recovered said halogen and water in a proportion suitable for forming the corresponding halogen hydrate, said hydrate forming means including a member having a surface thereon disposed in relative moving relationship with respect to said mixture for applying a film of said mixture thereon, heat transfer means for controlling said mixture and the surface of said member within a preselected temperature range for facilitating the formation of said halogen hydrate, removal means for dislodging the later of halogen hydrate formed on said surface, and return means for returning the regenerated said halogen hydrate to said reservoir of said electrical energy storage system.

2. The combination as defined in claim 1, wherein said member comprises a drum rotatably mounted with the peripheral surface thereof adapted to be disposed in contact with said mixture for continuously applying a film thereon which is transformed into a solid layer of said regenerated halogen hydrate.

3. The system of claim 2, wherein the water used in forming the halogen hydrate is from the aqueous metal halide electrolyte.

4. The system of claim 3, wherein the speed of relative movement between said surface and said mixture of halogen and water is controlled whereby said film is converted to a solid layer of halogen hydrate on said surface, said layer having a thickness of at least about 0.05 millimeters.

5. The system of claim 3, wherein the halogen hydrate is chlorine hydrate.

6. The system of claim 5, wherein the electrolyte is aqueous zinc chloride solution having a concentration ranging from about 10 to about 35 percent by weight and the oxidizable metal is zinc.

* * * * *